US009105040B2

(12) United States Patent
Kaplan et al.

(10) Patent No.: US 9,105,040 B2
(45) Date of Patent: Aug. 11, 2015

(54) SYSTEM AND METHOD FOR PUBLISHING ADVERTISING ON DISTRIBUTED MEDIA DELIVERY SYSTEMS

(75) Inventors: Robert E. Kaplan, Mercer Island, WA (US); Stuart Graham, Kenmore, WA (US); Mars Tanumihardja, Seattle, WA (US); Ajay Arora, Boston, MA (US); Johann Garcia, Kirkland, WA (US)

(73) Assignee: VULCAN IP HOLDINGS, INC, Seattle, WA (US)

( * ) Notice: Subject to any disclaimer, the term of this patent is extended or adjusted under 35 U.S.C. 154(b) by 1760 days.

(21) Appl. No.: 12/011,331

(22) Filed: Jan. 25, 2008

(65) Prior Publication Data

US 2008/0189168 A1  Aug. 7, 2008

Related U.S. Application Data

(60) Provisional application No. 60/898,855, filed on Jan. 31, 2007.

(51) Int. Cl.
*G06Q 30/02* (2012.01)
(52) U.S. Cl.
CPC ............ *G06Q 30/0201* (2013.01); *G06Q 30/02* (2013.01); *G06Q 30/0205* (2013.01); *G06Q 30/0207* (2013.01); *G06Q 30/0242* (2013.01); *G06Q 30/0256* (2013.01); *G06Q 30/0258* (2013.01); *G06Q 30/0273* (2013.01); *G06Q 30/0277* (2013.01)
(58) Field of Classification Search
CPC .......... G06Q 30/0205; G06Q 30/0256; G06Q 30/0277

USPC .................................. 705/7.34, 14.54, 14.73
See application file for complete search history.

(56) References Cited

U.S. PATENT DOCUMENTS 5,740,549 A * 4/1998 Reilly et al. ................ 705/14.42
5,841,987 A   11/1998 Blatter et al.

(Continued)

FOREIGN PATENT DOCUMENTS

JP       2005/293491       10/2005
WO    WO 0241262 A1 *    5/2002
WO      03/043336 A1      5/2003

OTHER PUBLICATIONS

International Search Report and Written Opinion in International Application No. PCT/US2008/052705 mailed on Jul. 16, 2008.

*Primary Examiner* — John G Weiss
*Assistant Examiner* — Adam Chornesky
(74) *Attorney, Agent, or Firm* — Dorsey & Whitney LLP

(57) ABSTRACT

A system for publishing advertising media on a plurality of media delivery systems, each configured to render media and gather environmental data while rendering the media. The system includes a front-end system in communication with the plurality of media delivery systems. The front-end system is configured to permit an advertiser to select at least one of the plurality of media delivery systems on which to render advertising media and is further configured to accept advertising media uploaded by the advertiser. The system further includes a back-end system in communication with the front-end system and the plurality of media delivery systems. The back-end system is configured to upload the advertising media to the selected media delivery systems for rendering and is further configured to upload the environmental data from the plurality of media delivery systems.

22 Claims, 12 Drawing Sheets

(56) References Cited

U.S. PATENT DOCUMENTS

| | | | | |
|---|---|---|---|---|
| 5,854,887 | A | 12/1998 | Kindell et al. | |
| 5,973,683 | A | 10/1999 | Cragun et al. | |
| 5,974,398 | A * | 10/1999 | Hanson et al. | 705/14.64 |
| 5,995,134 | A * | 11/1999 | Hayashi | 725/116 |
| 6,152,563 | A * | 11/2000 | Hutchinson et al. | 351/209 |
| 6,526,335 | B1 * | 2/2003 | Treyz et al. | 701/1 |
| 6,542,185 | B1 | 4/2003 | Bogardus | |
| 6,574,793 | B1 | 6/2003 | Ngo et al. | |
| 6,631,356 | B1 | 10/2003 | Van Horn et al. | |
| 6,645,078 | B1 * | 11/2003 | Mattice | 463/42 |
| 6,904,408 | B1 | 6/2005 | Mccarthy et al. | |
| 6,968,565 | B1 * | 11/2005 | Slaney et al. | 725/10 |
| 7,027,054 | B1 | 4/2006 | Cheiky et al. | |
| 7,187,786 | B2 | 3/2007 | Kee | |
| 7,302,475 | B2 | 11/2007 | Gold et al. | |
| 7,316,025 | B1 * | 1/2008 | Aijala et al. | 725/18 |
| 7,319,779 | B1 | 1/2008 | Mummareddy et al. | |
| 7,340,439 | B2 * | 3/2008 | Burger et al. | 705/65 |
| 7,364,068 | B1 | 4/2008 | Strubbe et al. | |
| 7,440,674 | B2 * | 10/2008 | Plotnick et al. | 386/343 |
| 7,505,621 | B1 | 3/2009 | Agrawal et al. | |
| 7,574,727 | B2 | 8/2009 | Nathan et al. | |
| 7,584,150 | B2 | 9/2009 | Hirotsune et al. | |
| 7,584,353 | B2 | 9/2009 | Risan et al. | |
| 7,664,124 | B2 | 2/2010 | Alston et al. | |
| 7,895,076 | B2 | 2/2011 | Kutaragi et al. | |
| 2002/0062481 | A1 * | 5/2002 | Slaney et al. | 725/42 |
| 2002/0065046 | A1 * | 5/2002 | Mankins et al. | 455/59 |
| 2002/0111146 | A1 * | 8/2002 | Fridman et al. | 455/99 |
| 2002/0112171 | A1 | 8/2002 | Ginter et al. | |
| 2002/0125993 | A1 | 9/2002 | Gutta et al. | |
| 2003/0060897 | A1 * | 3/2003 | Matsuyama et al. | 700/1 |
| 2003/0088832 | A1 * | 5/2003 | Agostinelli et al. | 715/526 |
| 2003/0126013 | A1 | 7/2003 | Shand | |
| 2004/0003393 | A1 | 1/2004 | Gutta et al. | |
| 2004/0073482 | A1 * | 4/2004 | Wiggins et al. | 705/14 |
| 2004/0093264 | A1 * | 5/2004 | Shimizu | 705/13 |
| 2004/0111360 | A1 | 6/2004 | Albanese | |
| 2004/0128198 | A1 | 7/2004 | Register et al. | |
| 2005/0038749 | A1 | 2/2005 | Fitch et al. | |
| 2005/0149396 | A1 * | 7/2005 | Horowitz et al. | 705/14 |
| 2005/0171897 | A1 * | 8/2005 | Forsythe et al. | 705/37 |
| 2005/0288954 | A1 | 12/2005 | Mccarthy et al. | |
| 2006/0093998 | A1 | 5/2006 | Vertegaal | |
| 2006/0100980 | A1 | 5/2006 | Reed et al. | |
| 2006/0117341 | A1 | 6/2006 | Park | |
| 2006/0136294 | A1 | 6/2006 | Linden et al. | |
| 2006/0147192 | A1 | 7/2006 | Zhang et al. | |
| 2006/0170670 | A1 * | 8/2006 | Burke | 345/418 |
| 2006/0174261 | A1 | 8/2006 | Cline, Jr. et al. | |
| 2006/0188109 | A1 | 8/2006 | Makino et al. | |
| 2006/0282465 | A1 | 12/2006 | Sharma | |
| 2007/0073579 | A1 | 3/2007 | Immorlica et al. | |
| 2007/0073585 | A1 * | 3/2007 | Apple et al. | 705/14 |
| 2007/0073589 | A1 | 3/2007 | Vergeyle et al. | |
| 2007/0089125 | A1 | 4/2007 | Claassen | |
| 2007/0105536 | A1 * | 5/2007 | Tingo, Jr. | 455/414.1 |
| 2007/0124157 | A1 * | 5/2007 | Laumeyer et al. | 705/1 |
| 2007/0150340 | A1 | 6/2007 | Cartmell | |
| 2007/0155497 | A1 * | 7/2007 | Okada | 463/36 |
| 2007/0179852 | A1 * | 8/2007 | Martin et al. | 705/14 |
| 2007/0198334 | A1 * | 8/2007 | Mebruer | 705/14 |
| 2008/0004953 | A1 * | 1/2008 | Ma et al. | 705/14 |
| 2008/0059521 | A1 * | 3/2008 | Hutson et al. | 707/104.1 |
| 2008/0147488 | A1 | 6/2008 | Tunick et al. | |
| 2008/0154671 | A1 * | 6/2008 | Delk | 705/7 |
| 2008/0167992 | A1 * | 7/2008 | Kokernak et al. | 705/51 |
| 2008/0183560 | A1 | 7/2008 | Kaplan et al. | |
| 2008/0183575 | A1 | 7/2008 | Kaplan et al. | |
| 2008/0189168 | A1 * | 8/2008 | Kaplan et al. | 705/10 |
| 2008/0255915 | A1 * | 10/2008 | Collins et al. | 705/8 |
| 2009/0048908 | A1 | 2/2009 | Kaplan et al. | |
| 2009/0142038 | A1 | 6/2009 | Nishikawa | |
| 2010/0106597 | A1 * | 4/2010 | Jayakody | 705/14.53 |

* cited by examiner

SYSTEM AND METHOD FOR PUBLISHING ADVERTISING ON DISTRIBUTED MEDIA DELIVERY SYSTEMS

RELATED APPLICATION DATA

This application claims benefit of U.S. Provisional Patent Application Ser. No. 60/898,855, entitled BACK-CHANNEL MEDIA DELIVERY SYSTEM, filed Jan. 31, 2007, which application is incorporated herein by reference.

TECHNICAL FIELD

The present invention relates to advertising, and in particular, publishing advertisements on distributed advertising systems capable of gathering information from the locations of the advertising systems and providing feedback to the advertiser related to the advertising.

BACKGROUND OF THE INVENTION

It has always been difficult for advertisers to gauge the effectiveness of their advertisements particularly where the advertising is done through traditional modes of advertising such as television or newspaper. Generally speaking, television networks and newspaper publishers have only approximate statistics on the number of viewers or readers within a given market. Newspaper publishers, for example, can approximate the number of newspapers that are read on any given day based on subscription and other sales data. Of course, every person who receives a newspaper is not going to read every advertisement within that paper. Consequently, newspaper publishers and those who purchase advertisements from the publishers have only a loose idea of how many people are exposed to or actually read their advertisements. Likewise with television advertising, the viewership of any given program, and the commercials that run during such programs, is not known with precision. The so-called 'ratings' for television programs are gathered statistically and again, calculating the number of people who are reached with any given advertisement is imprecise. Ideally, advertisers would like more substantive feedback about who and how their advertising content is being viewed.

With the rise of Internet advertising, advertisers are given more direct and immediate feedback on who is viewing their advertisements. Suppose, for example, that an advertiser purchases advertisements on the website of a major internet search engine such as Google. The advertisement provider, Google in this case, gathers data on the precise number of times that a given advertisement is actually rendered during a page view. Likewise, the advertisement provider can gather data representing the precise number of times a given advertisement is actually clicked by the viewer of the advertisement. Such feedback is invaluable because it allows advertisers to get feedback on the exact, rather than approximate, number of impressions the advertising made on the target audience. An 'impression' is any exposure a person has to an advertisement. In the context of a newspaper, an advertisement has an impression every time a person turns to the page of the paper where the advertisement is located. Since it is not possible to know with any certainty what pages of a newspaper are every actually viewed by a person, it is not possible to know with any certainty how many impressions a newspaper-based advertisement receives. A similar problem exists with television advertising because, as was discussed above, television 'ratings' are statistical estimates and calculating the number of people reached with any given advertisement is imprecise.

In addition to impression information, the feedback provided by an internet advertisement provider such as Google also provides valuable information about how effective an internet-based advertisement is in generating an inquiry (i.e. it tells you how many impressions actually result in a click on the advertisement). Data generated by, and fed back from, an advertising channel is more commonly known as 'back-channel data.' Back-channel data has increasingly become the currency driving Internet advertising business. Absolute measurement—vs. statistical analysis—is key to advertisers, corporate and content programmer confidence.

Although television, newspaper and magazine advertising channels continue to be very important, other forms of advertising such as audio, video and electronic signage in retail spaces, hotels, restaurants and other public places are becoming increasingly prevalent. Such advertising media might comprise playback of DVD's, computer generated media or animation, set-top box video and audio, satellite dish video, streaming internet protocol television ('IPTV'), still pictures, or even audio. Some such systems have the capability to report on what media content was played at what time and to schedule the time at which particular media is played. While these are very valuable controls for advertisers who wish to control their messaging, there is currently no mechanism for reporting how many people were or are exposed to an impression of such media content. Likewise, there is no mechanism for adapting the media content to account for local variables and conditions detected during media playback.

As is discussed in detail below, media delivery systems have been developed that gather data about the number and type of human impressions of media content delivered by a content rendering device. Such media delivery systems permit cross-correlation of such impression data with the media content. Such a system may also alter the media content it delivers based on such data. With the development of such media delivery systems, a need has developed for systems and methods for allowing advertisers and advertising agencies to quickly and easily publish or commission the display or playback of their advertising media on such systems. Because of the rich back-channel data gathered by such media delivery systems, there is also a need for systems and methods for allowing advertisers and advertising agencies to access and use such data to further refine their advertising strategies.

DETAILED DESCRIPTION OF EMBODIMENTS OF THE INVENTION

Techniques are described below for consolidating and correlating information about media content that is rendered by a distributed media delivery system with information about the number of impressions the content made on people within some detectable proximity of the system. Although described below in terms of a media delivery system manager and display, it should be understood that such media rendering and display devices, as well as other related components, are only exemplary. Other types of media, such as still pictures or audio, may also be rendered by embodiments of the invention by an appropriate display or playback device and information about the number and type of impressions of such content likewise collected, consolidated and correlated. In particular, although embodiments of the invention are described in terms of a media delivery system manager, it will be understood that any computing device or devices capable of performing the disclosed functions of the a media delivery system manager will suffice. Likewise, although the media delivery system has been described in terms of advertising and advertising media, embodiments of the invention are not so limited. Embodiments of the invention may, therefore, render media that is not specifically advertising related.

Figure 1A:
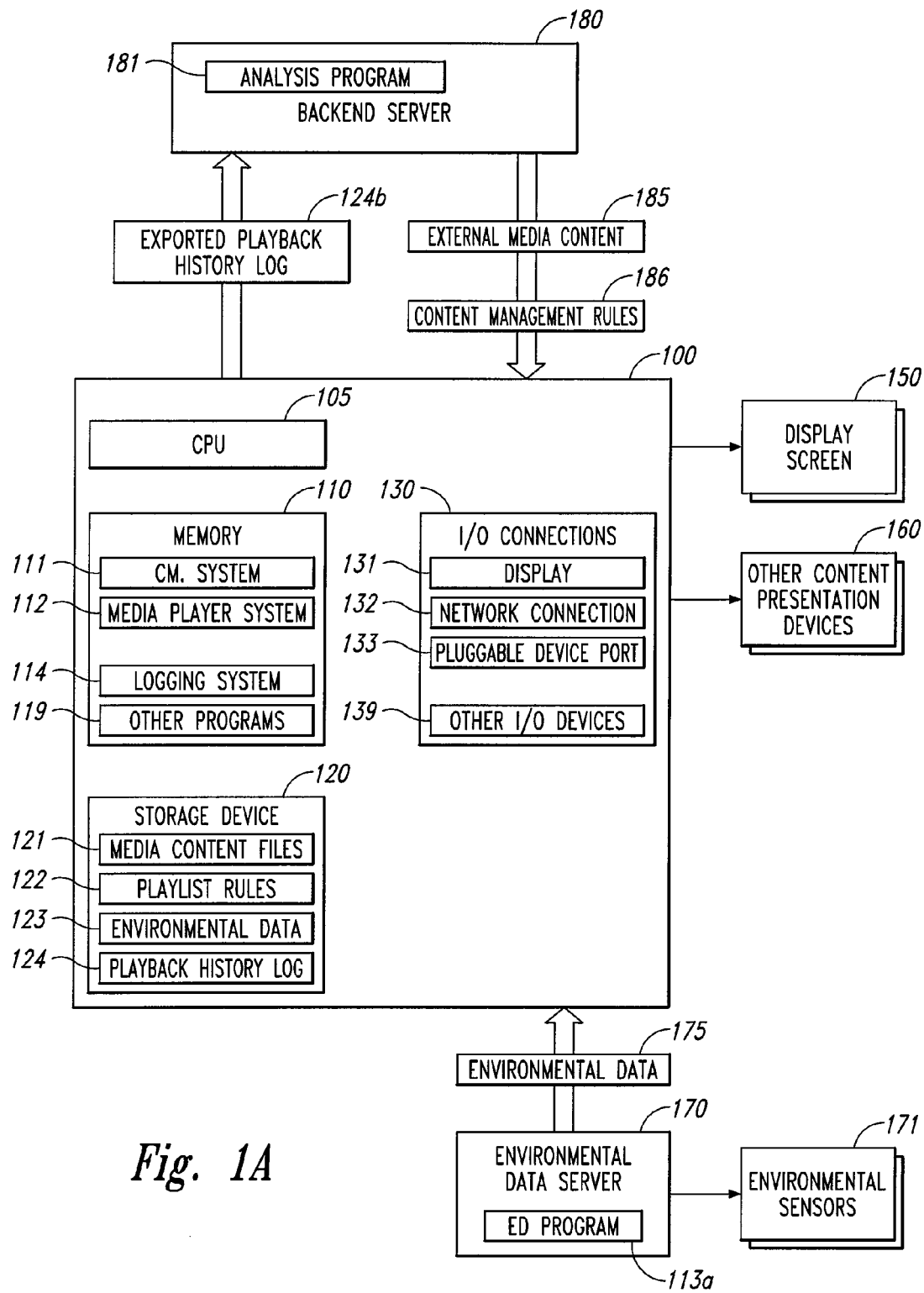
FIGS. 1A and 1B are detailed block diagrams of example embodiments of distributed media delivery systems.

FIG. 1A depicts a distributed media delivery system according to one embodiment of the invention. The system includes a media delivery system manager 100, a display 150, environmental sensors 171, an environmental data server 170 and a backend server 180. The media delivery system manager 100 includes, among other things, a content management system 111, a media player system 112 and a logging system 114. Although discussed in terms of such components and programs, alternative embodiments of the invention are possible and it will be understood that the embodiments discussed below are for illustrative purposes only. In an alternative embodiment, the media delivery system manager 100 may, for example, include only the content management system 111 and the logging system 114 whereas the media player system 112 is physically separate from the media delivery system manager 100. Indeed, any of the functions of the content management system 111, the media player 112 and the logging system 114 may be performed by devices or systems that are physically separate.

The media player system 112, along with the display 150, or other content presentation devices 160, are used to render instances of media content that embody and convey the message intended for the audience. As will be discussed more fully below, media content 121 stored in storage device 120 is selected by the content management system 111 for playback and is processed and rendered on the display 150, or other content presentations devices 160, by the media player system 112. Examples of storage devices 120 include hard drives, flash memory, remote server, network attachable storage and other types of non-volatile storage and memory devices. Typically, the media content 121 is rendered as digital or analog signals which are routed to input/output (I/O) connections 130 on the media delivery system manager 100. For example, in the case of video media, video signals are routed to the display I/O connection 130. Other types of media, such as audio or pictures, may be routed to other devices through their respective connections 139. The I/O connections 130 further include a network I/O connection 132 for routing signals between the media delivery system manager 100 and a network. The network I/O connection 132 might be comprised of, for example, a modem connection or an 802.11x WiFi connection. A pluggable device port I/O connection 133 can be used to connect the media delivery system manager 100 to a pluggable device, as will be described in more detail below.

The output signals are then electronically transferred from these I/O connections 130 to an appropriate device, for example, from the display I/O connection to the display 150 or from the I/O connections 139 to some other media content presentation device 160. In at least some embodiments, the output and input connections follow A/V industry standard formats (e.g., Component, Composite, VGA, DVI, and HDMI). Such embodiments of the media delivery system manager 100 can process and render, for example, at least one of the following digital media formats using an associated CODEC: MP3, MPEG2, MPEG4, AVI and Windows Media files such as WMA (for audio) and WMV (for video). It will be understood that these digital media formats are only for illustrative purposes and other types of media might be rendered by the media player system 112.

The distributed media delivery system also includes environmental sensors 171. These sensors are responsible for detecting a myriad of environmental states, signals and conditions indicative of a human impression of the media content rendered by the media player system 112. In the embodiment of FIG. 1A, one or more sensors 171 are configured to count foot-traffic in the vicinity of the distributed media delivery system and these sensors are connected to an environmental data server 170. In one embodiment, the count of foot-traffic corresponds to the count of impressions. As will be discussed more fully below, the count of impressions is stored and used with playlist rules or for post-processing. The sensors 171 may be connected through, for example, a wired connection, which includes an Ethernet, RS-232 serial, USB or modem connection, or they may connect wirelessly through, for example, an 802.11x WiFi network, or a Bluetooth or Infra-Red connection. An environmental data program 113a is executed on the data server 170 and processes the signals received by the environmental data server 170 from the sensors 171. The environmental data program 113a can use various parameterized algorithms to determine whether the sensors 171 have detected a impression. The Environmental data 175, which includes the number of valid impressions, is transmitted to the media delivery system manager 100 for further processing and, as will be discussed in more detail below, for use by content management system 111. In at least some embodiments, in addition to being used for counting the number of impressions, the environmental sensors 171 are capable of capturing "dwell time" of a person in an area in the vicinity of the distributed media delivery system. Dwell time is a measure of how long the person or persons remained in proximity of the sensors 171 or distributed media delivery system. That is, in these embodiments the sensors 171 are capable of determining when a person is in proximity to the distributed media delivery system 100, and additionally, determining how long they stay in proximity.

The number of impressions and other environmental data is transmitted to the media delivery system manager 100 via an I/O connection 131 such as, for example, the network connection 132 or through the pluggable device port 133. Some examples of sensor types include, but are not limited to, thermal imaging camera sensors, infrared sensors, pressure sensors, video imaging camera sensors, sonar sensors, laser sensors, audio sensors, motion sensors and RFID tag sensors. In some embodiments, the environmental sensors 171 are integrated into or attached to the display device 150, and in other embodiments, the sensors 171 are be integrated into or attached to the media delivery system manager 100 itself. In other embodiments, the environmental sensors 171 may be installed anywhere within a suitable vicinity of the display device 150. For example, on the wall, ceiling or floor, within windows or doors, or self-contained and free standing.

The environmental data 175 is processed by the logging system 114 executing on the media delivery system manager 100. The data is stored in the storage 120 temporarily or permanently on the media delivery system manager as environmental data 123. In one embodiment, the media player system 112 communicates with the logging system 114 via an inter-process-communication mechanism, either in a event-driven or polling fashion, to provide playback information, such as playback state and metadata, of the media content the media player system 112 is rendering. The logger program 114 aggregates and correlates the media playback information, duration of the media content, and a timestamp of when the media content was rendered together with the environmental data 123. The resulting output of the logging system 114 is a playback history log file 124.

As previously discussed, instances of media rendered by the distributed media delivery system may include a variety of different types of media such as video, audio or still pictures. In one embodiment, such media is managed by the content management system 111 which is part of the media delivery system manager 100. The content management system 111 enables a user to define playlist rules 122 that govern what media content 121 is to be loaded onto the storage 120 of the media delivery system manager 100 for playback as well as for defining playlist rules that govern when or how often instances of media content are to be rendered on the display device 150 or other content presentation devices 160.

In some embodiments, the playlist rules that govern the playback of media content, along with the media content files, are transferred onto the media delivery system manager 100 from an external location such as another networked computing device commonly known as the backend server 180. In other embodiments, where network connectivity is not available, such rules and media content may be transferred from an external data store onto a removable memory storage device (not shown) (e.g., a Universal Serial Bus (USB) flash memory drive), and then transferred from the removable memory storage device onto the media delivery system manager 100 by connecting the removable memory storage device to a compatible I/O connection 130 on the media delivery system manager 100, for example, a USB port. Although discussed in terms of a USB flash drive, other modes of transferring playlist rules and media content are possible. For example, other forms of portable, non-volatile storage such as DVDs, CDs, tape or floppy disk or Memory Cards such as Compact Flash, Secure Digital Card, MultiMedia Card, SmartMedia, Memory Stick, Memory Stick PRO, xD-Picture Card or a Micro Drive might be used instead. In alternative embodiments where Internet connectivity is not possible, the distributed media delivery system communicates with the backend server 180 via a modem or other data connection.

Turning to the playlist rules, many different rules can be specified, with the number and type of rules related to the capabilities of the media delivery system manager 100 and environmental sensors 171. An example of a simple playlist rule is one that is time based. For example, the content management system 111 can be instructed via a playlist rule to play a certain media selection according to the current time of day, day of the week, or a combination of the two. The rules can further specify a sequential, random or weighted randomization of media selections during a given time period. Different rules can be applied to different times of the day and on different days of the week. For example, supposing an embodiment of the invention were placed on a commuter train for playing advertisements or other media to commuters. In such a situation, the audience would be different during the rush hour commute than it would be, for example, at noon. Likewise, the audience on such a train would be different on the weekend than it would be during an ordinary mid-week work day. Playlist rules allow embodiments of the invention to be sensitive to these differences and enable an advertiser, for example, to tailor the selection and playback of media accordingly.

Another example of a playlist rule is one which specifies that the same media should not be repeated within a given period of time. In the commuter train example above, it is likely that almost the same audience would be on board the train from, for example, the suburbs into the city. Once the train has emptied at its destination, the playlist rules could permit the media selections to repeat because presumably, a new audience would be present to see the media content.

Playlist rules may also specify quotas for specific media with promotion or demotion of playback priority based on the number of impressions each media has received. For example, suppose a particular advertisement, 'ad A', is targeted to receive 100 impressions in a month. Suppose that 'ad B' is targeted to receive only 50 impressions per month. Further suppose that 'ad B' has already received 40 impressions while 'ad A' has received only 30. The content management system 111 may, in such a situation, boost the priority of 'ad A' so that it plays more frequently and likewise decrease the play priority of 'ad B' so it plays less frequently. In this way, the distributed media delivery system can increase the likelihood that each advertisement will receive its targeted number of impressions. The play priority for any given piece of media may also be specified based on a premium service where advertisers, for example, pay a premium for more impressions or for playback priority.

In other embodiments, media can receive a higher playback priority because of its particular perishability. That is, certain media content is particularly time sensitive and in recognition of this, such media will receive a higher playback priority to hopefully increase the number of impressions. Examples of such media could involve sporting events (e.g., the Super Bowl), the season finale of a popular television show or media content related to an election.

More complex playlist rules can be used by the content management system 111 in conjunction with environmental data 123 provided by the environmental sensors 171. In one embodiment, the environmental sensors 171 act as traffic counters that simply count the number of persons passing in proximity to the distributed media delivery system. The traffic count is provided as feedback to the distributed media delivery system as was previously discussed. According to a particular rule, the content management system 111 may then prioritize the playback of specific media items or groups of media for playback during times of high traffic. It can also be specified in the playlist rules that the same media should not be played back-to-back. The playlist rules can also be used to have the content management system 111 prioritize specific media items or a group of media items to playback when the system senses a high traffic-count. A high-traffic count might be characterized in different ways. For example, the content management system 111 might consider passing a certain traffic-count threshold as "high-traffic." Alternatively, the content management system 111 could characterize a large change in traffic within a certain period of time as high traffic and ignore the raw number of traffic counts altogether.

Although traffic counting sensors are perhaps the most common type of environmental sensors 171, more sophisticated sensors are capable of sensing and measuring more complex data for use with more complex playlist rules and data gathering. For example, as previously discussed, some sensors are capable of measuring the dwell time of a person or persons within a proximity of the distributed media delivery system. Such capability is useful for helping determine the efficacy of any given advertisement. For example, it is advantageous to know that while 'ad A' was watched by 10 persons, only 2 of them stay for the entire 30 second duration of the advertisement. This data is valuable if you also know that 'ad B' was also watched by 10 persons and 8 of them stayed for the entire 30 second duration of the advertisement. The simplest sensors would detect only proximity and determine how long a person or persons are in proximity to the distributed media delivery system.

Another type of sensor could read the information stored in an RFID tag. Such a tag might be placed in products sold in a store. In one embodiment, the sensors in a distributed media delivery system could determine what the quantity and type of products a person has in their shopping cart as they approach the system in a retail store. Such data could then be used to select media for playback that is tailored for that particular person and their buying habits. Alternatively, RFID tags could be placed in the name tags of persons attending a large convention. The RFID tag could store information about that particular persons area of expertise. The RFID tag could then be read as the person moves about the convention and media content that would be of interest to such a person could be adaptively rendered by a distributed media delivery system as they pass by.

In yet another embodiment, environmental sensors could possibly detect the height and weight of a person in proximity to the distributed media delivery system. Such information might be particularly useful especially when coupled with other information. Perhaps, for example, the playlist rules can be used to have the sensors 171 interpret a shorter, lighter person in front of the system during after-school hours between 3 and 5 P.M. to be children. In such instances, the playlist rules can further control the content management system to render media content intended for children.

Embodiments of the invention might also include one or more environmental sensors capable of tracking the attention of persons in proximity to the distributed media delivery system. There are many possible configurations of attention tracking sensors. Some attention tracking sensors, for example, can track the attention of a subject through the measurement or detection of aspects of the subject's face. One such attention tracking sensor might, for example, use a camera and suitable illumination to capture images of an area in proximity with the distributed media delivery system. Suitable processing of the images could be used to determine the locations of people within the image and in particular, where those people are actually looking. Such processing could, for example, detect whether a person is looking at the screen based on, for example, the angle of their facial features within the captured images. As is known in the art, there are complex algorithms such as the mean shift algorithm that allow for face recognition and face tracking and such algorithms may be advantageously employed in an attention tracking sensor.

Alternatively, methods exist for attention tracking based on tracking only on the eyes. A suitable eye tracking algorithm may process the captured images in order to determine whether the subject's eyes are pointed at the distributed media delivery system. Attention tracking using only the eyes may be advantageous in certain lighting situations or where the particular illumination results in accentuation of the eyes within the captured images. Attention tracking using both the eyes and other aspects of the face or head may be advantageous since although a person's face may be generally facing the distributed media delivery system, they may not be looking directly at the system. Instead, for example, they may be looking at something behind or to the side of the system. Use of eye tracking may thus permit attention tracking sensors to be more accurate. An attention tracking sensor incorporated into the embodiment depicted in FIG. 1A would allow the distributed media delivery system to determine whether each individual in the defined field is looking at the display 150 from moment to moment.

Attention tracking sensors would permit embodiments of the distributed media delivery system to gather information on how long each individual looks at the screen. Gathering such information on a second-by-second basis permits gauging the effectiveness of a particular instance of media content, or different time segments within that instance, in getting and maintaining the attention of people. Likewise, through the use of an appropriate playlist rule, one embodiment of the distributed media delivery system could dynamically alter rendering of media in response to changing interest in the media being rendered. For example, suppose a person is watching the display 150 of the embodiment depicted in FIG. 1A. An attention tracking environmental sensor connected to such an embodiment could detect that the person is no longer paying attention or has averted their gaze in some manner, and that information could cause the system to start rendering a different instance of media. Alternatively, other embodiments of the system might change the volume of sound, change the brightness of the display, or other parameters of media playback in an attempt to regain the person's attention.

An attention tracking environmental sensor could also permit more accurate determination of a person's size, shape, height or the speed with which they move. Such information could be used by embodiments of the invention to generate probabilistic demographic information. Such information is useful and valuable in and of itself. Such information might also, however, be used by a playlist rule within an embodiment of the invention to custom tailor a media selection suitable for the person mostly likely to be watching the display at that moment.

With further reference to FIG. 1A, although the media delivery system manager 100 is capable of functioning more or less autonomously using playlist rules and environmental data, the media delivery system manager 100 may also periodically synchronize with the backend server 180. The backend server 180 receives the playback history log file 124 and can also upload new media content 185 and playlist rules 186 to the media delivery system manager 100. Alternatively, the media delivery system manager may continually communicate with the backend server 180 allowing the playback history to be communicated to the backend server 180 in real-time. The playback history log file 124 may be reformatted and exported as some digitally transmittable format prior to being transmitted to the backend server 180. In some embodiments, the transmission makes use of HTTP over TCP/IP protocols between media delivery system manager 100 and the backend server 180, which could be connected via an Ethernet network. The connection could also be wireless using an 802.11x WiFi network, Bluetooth connectivity, Cellular connectivity, radio frequency, or some variation thereof. The transmitted playback history log file 124 is collected, stored, and analyzed on the backend server 180 and available for various reporting functionality as needed by the user of the system. The backend server 180 is able to support the simultaneous collection of playback history log file 124 from multiple media delivery system managers 100. The playback history log files 124 are aggregated and processed by an analysis program 181 that executes on the backend server 180. The analysis program 181 generates reports, and can further allow users to interactively query and view the imported playback history log file 124 and aggregated information.

Figure 1B:
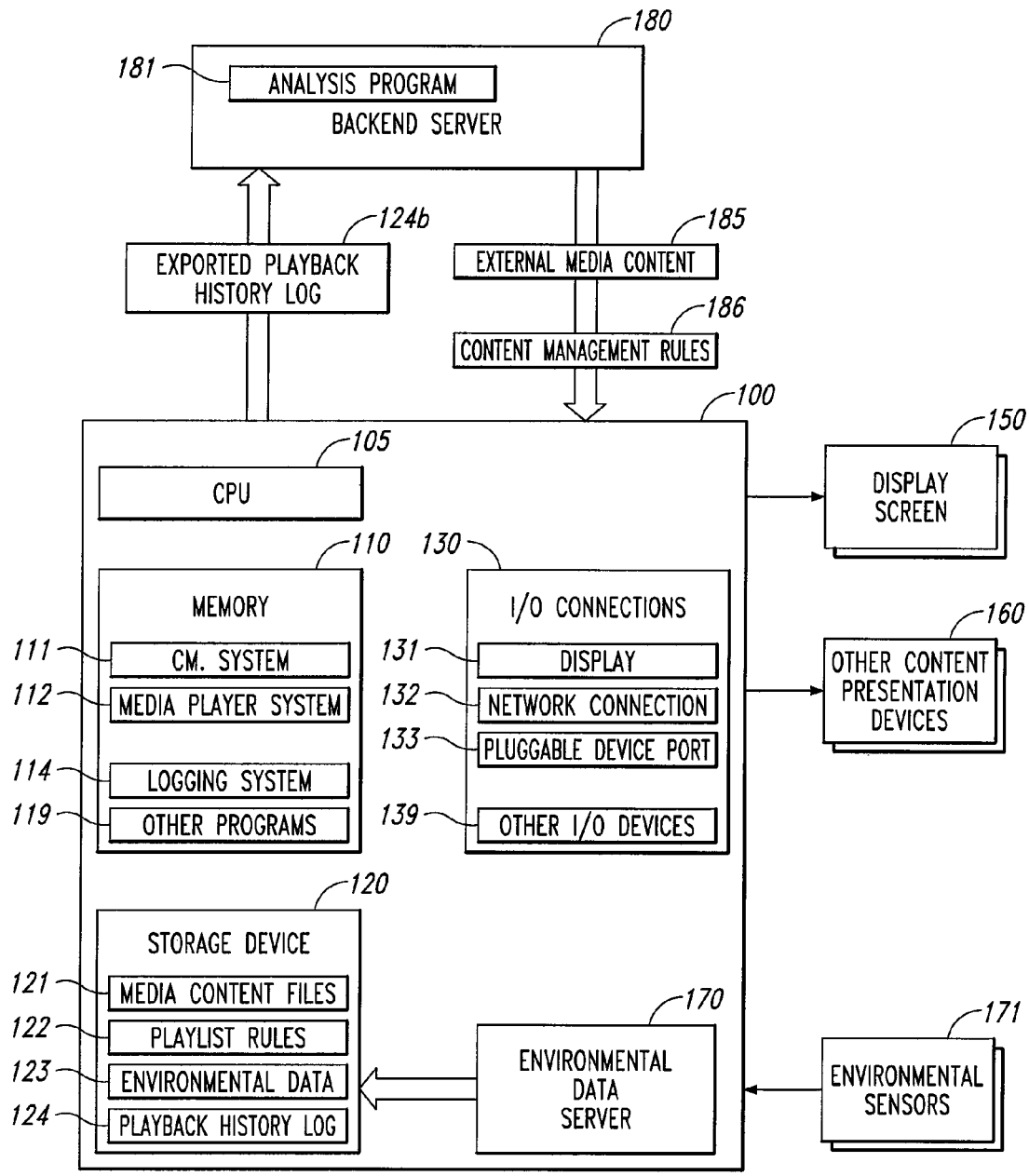

FIG. 1B depicts an embodiment of the distributed media delivery system wherein the environmental data server 170 is integrated into the media delivery system manager 100. Such an embodiment obviates the need for network connections between the environmental data server 170 and the media delivery system manager 100 as well as the need for separate server hardware for the environmental data server. In some embodiments, the environmental sensors 171 are likewise directly connected to the media delivery system manager 100. The functionality of these embodiments is otherwise identical to the embodiments discussed above.

Figure 2A:
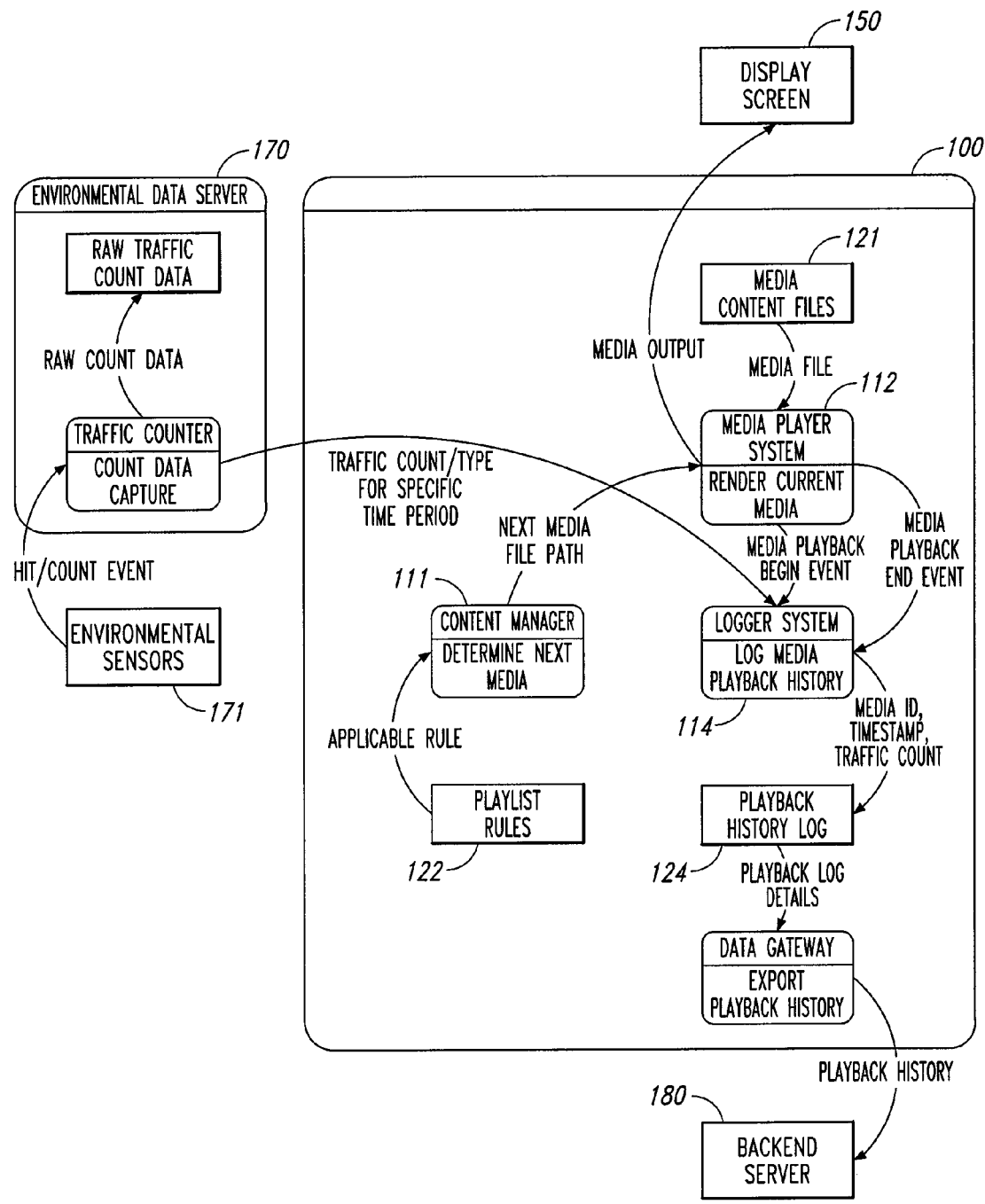
FIGS. 2A-2C are data flow diagrams of operation of example embodiments of distributed media delivery systems.

FIG. 2A is a data flow diagram that describes the flow of data within the embodiment of system depicted in FIG. 1A above. Operation of this embodiment of the distributed media delivery system typically begins with the content management system 111 determining the next media to render in accordance with the playlist rules 122. The content management system 111 communicates the location of the next media to the media player system 112. The media player system 112 retrieves the appropriate media file from the media content files 121 and then typically renders the media on, for example, the display screen 150. When the media player system 112 begins to render the media, it generates a media playback begin event which is communicated to the logger program 114. When the media player system 112 stops rendering that particular media, it generates a media playback end event that is also communicated to the logger program 114.

While the media is being rendered, the environmental sensors 171 begin detecting impressions and generate count events which are communicated to the environmental data server 170. The traffic count and type of traffic is passed from the environmental data server 170 to the logger program 114. During the period of time between the media playback begin event and end event, the logger program 114 logs the media ID, the timestamp and the traffic count and other environmental data to the playback log file 124. Periodically, the playback log will be exported to the backend server 180.

Figure 2B:
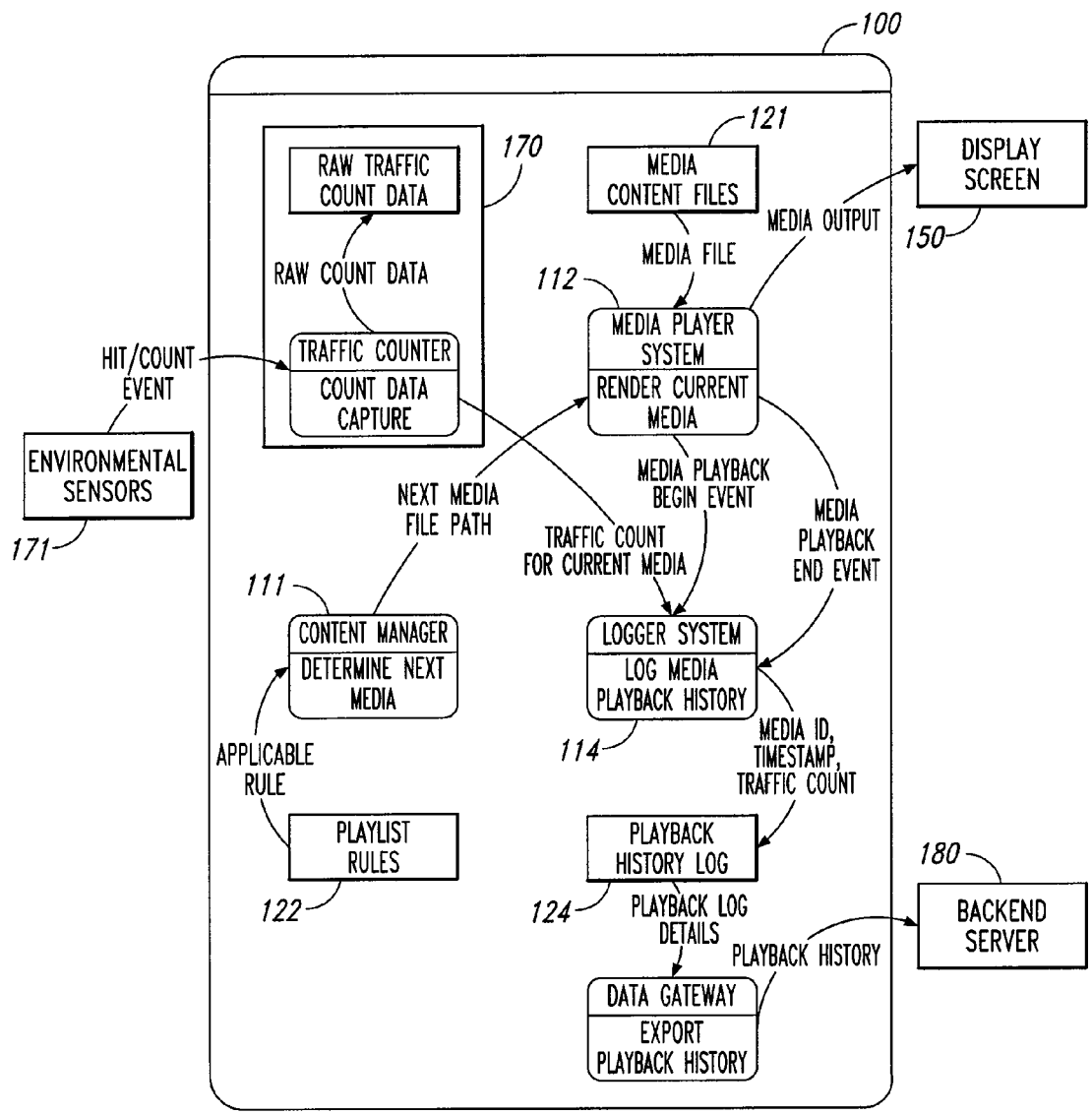

FIG. 2B is a data flow diagram that describes the flow of data within the embodiment of the system wherein the environmental data server 170 is integrated into the media delivery system manager 100 and as depicted in FIG. 1B. The data flow shown in FIG. 2B is essentially the same as that of FIG. 2A except that the environmental sensors 171 communicate directly with media delivery system manager 100 and its integrated environmental data server 170.

Figure 2C:
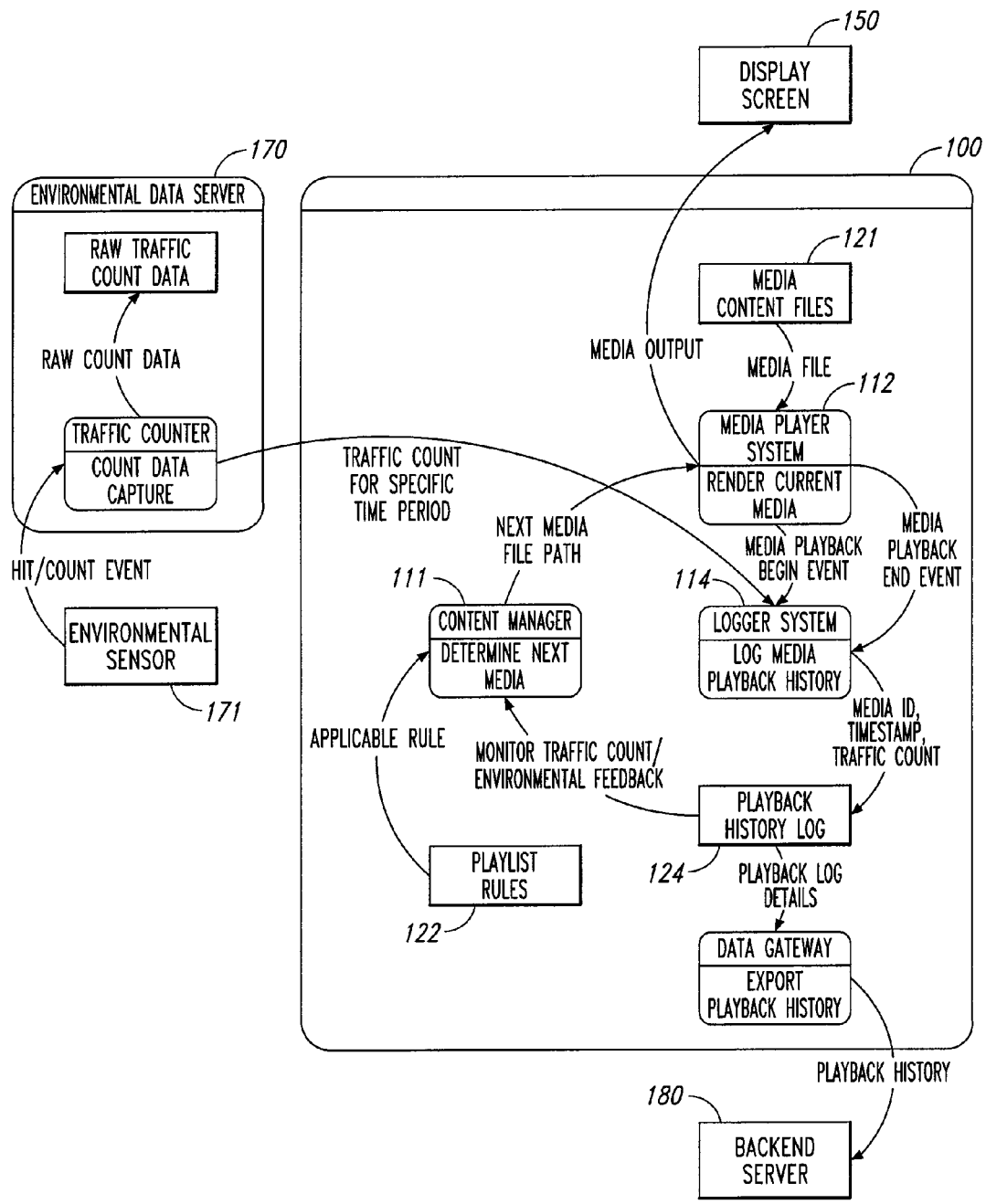

FIG. 2C is a data flow diagram of an example embodiment of a distributed media delivery system where the collected environmental data is used as feedback to help determine the next media to play. During the time that the media player system 112 is rendering a media content file and the logger program 114 is likewise creating the playback history log 124, information about the traffic count and other environmental feedback is communicated back to the content management system 111. This feedback is used in conjunction with the playlist rules 122 to determine the next media content to render. The data flow depicted in this Figure is otherwise identical to that of FIG. 2A.

Figure 3:
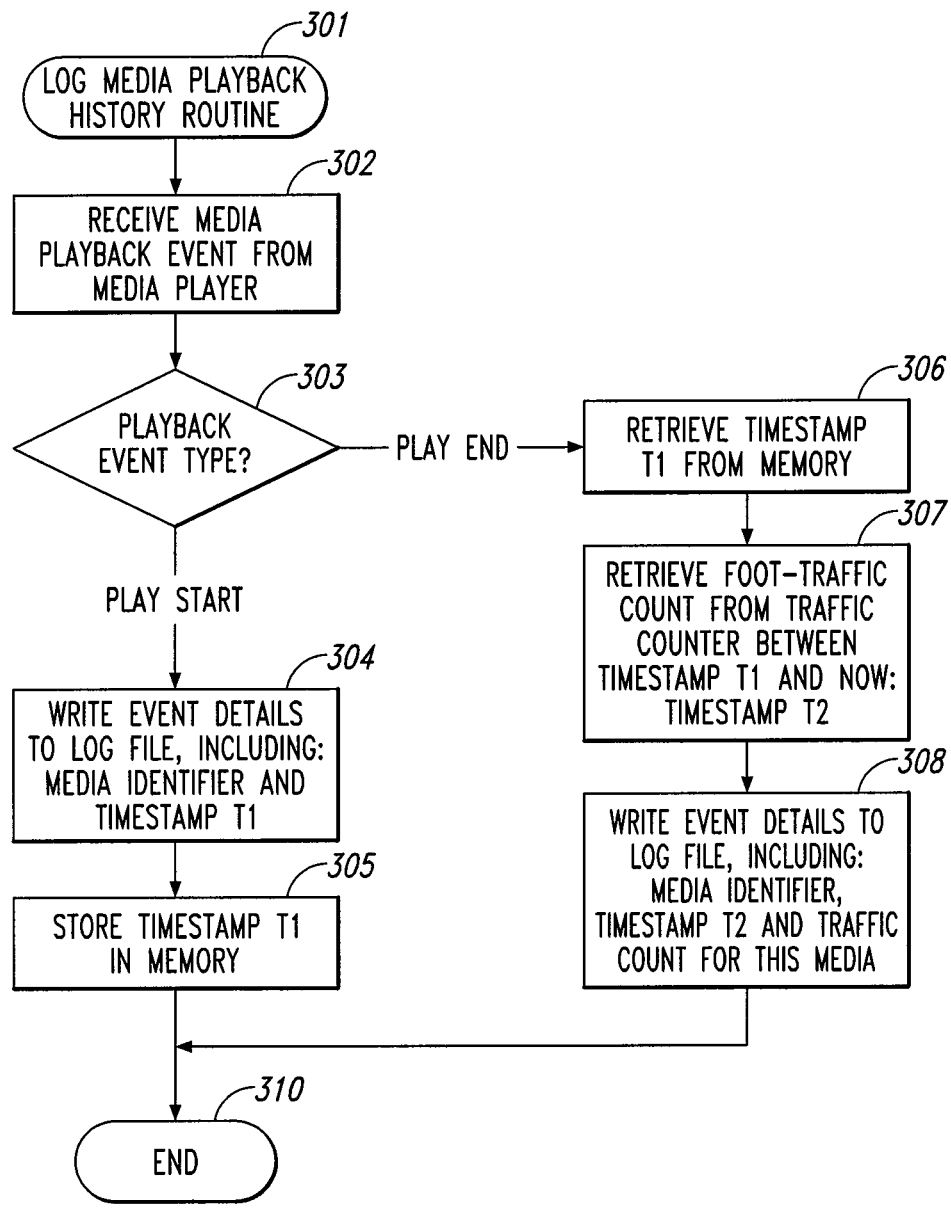
FIG. 3 is a flow diagram of an example embodiment of a routine for a logging system of a distributed media delivery system.

FIG. 3 shows a flow chart diagram for one implementation of the log media playback history routine 301 of the logging system 114. A media playback event is received from the media player system 112 at step 302. The logging system 114 checks the playback event type at step 303. If the playback event type is a "Play Start" event, the event details are written to the log file at step 304, including the media identifier and timestamp T1 information. The timestamp T1 is stored in memory at step 305 for use later when a "Play End" event is received. The routine ends 310. If the playback event type is a "Play End" event, the timestamp T1 that was stored in memory is retrieved at step 306. Environmental sensor count data for the time interval between timestamp T1 and the current timestamp T2 is retrieved from the environmental data 123 at step 307. The event details are written to a playback history log file 124 at step 308 including the media identifier, the timestamp T2, and environmental sensor count data. Once the playback history log file 124 has been completed, it may be exported to the backend server 180 for further analysis.

Figure 4:
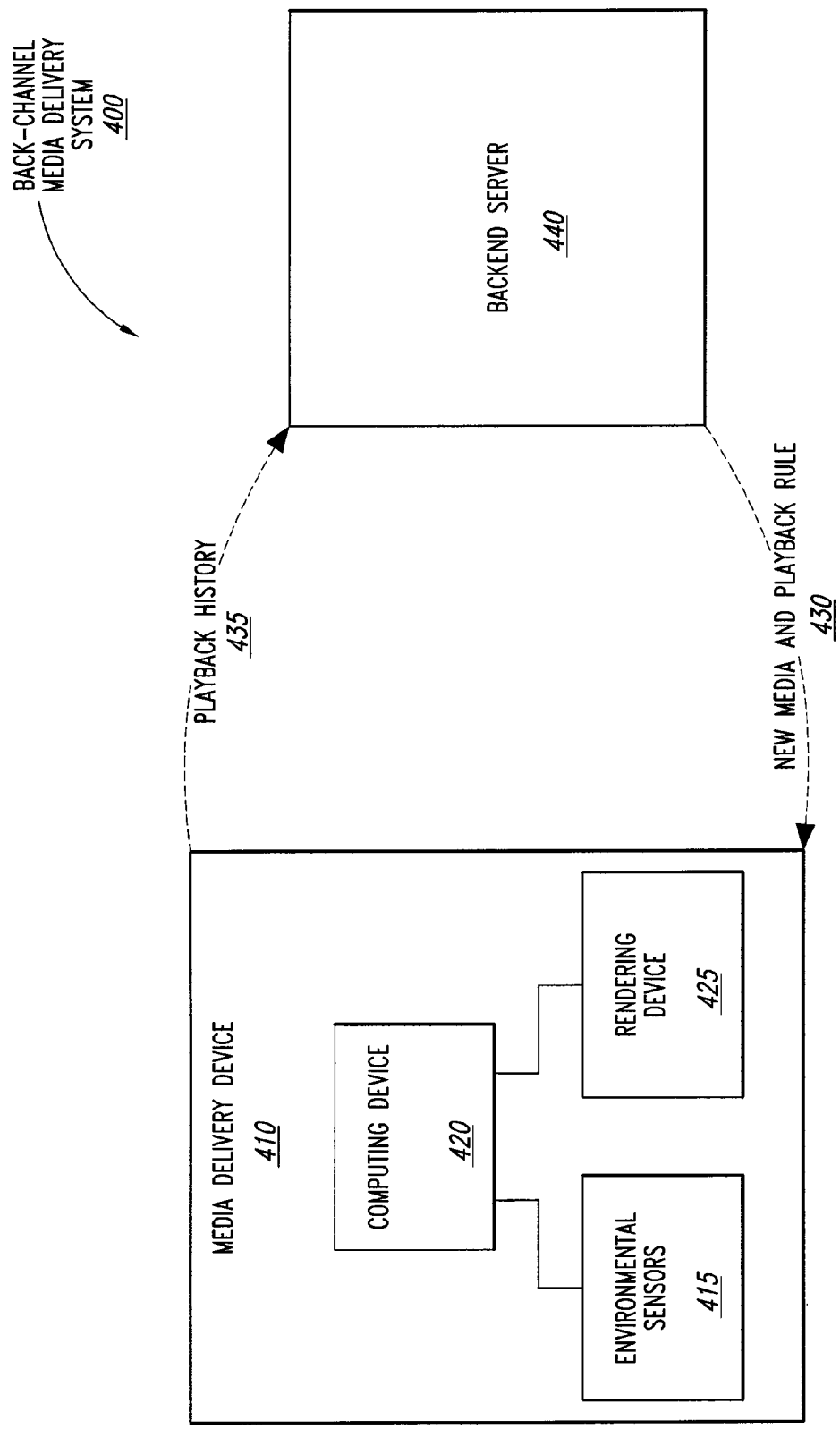
FIG. 4 is a high-level block diagram of an example embodiment of a distributed media delivery system.

FIG. 4 depicts a high level block diagram distributed media delivery system according to one embodiment of the invention. Although FIG. 4 illustrates a particular embodiment, it will be understood that alternative embodiments are possible as is evident from the embodiments and variations described above. The distributed media delivery system 400 includes a media delivery device 410 and a backend server 440. The media delivery device 410 includes a computing device 420. The media device 410 also includes environmental sensors 415 and a rendering device 425 coupled to the computing device 420. The computing device 420 selects media stored on the computing device 420 for rendering on the rendering device 425. Alternatively, the computing device 420 may select media stored elsewhere. The computing device 420 then renders the media on the rendering device 425. While rendering the media, the computing device 420 gathers environmental data from the environmental sensors 415. The computing device 420 compiles the playback history 435 and transmits this history that is received by the backend server 440. As was discussed more fully above, the backend server 440 is used to process and analyze the back-channel data. From this data, new playback rules may be devised for use by the media delivery device 410 during future renderings of new media on the rendering device 425. New media and playback rules 430 are then transmitted to the media delivery device 410. It will be understood that receiving the playback history 435 by the backend server 440 and sending the new media and playback rules 430 to the media delivery device 410 may be accomplished in numerous ways. For example, and as was discussed more fully above, the communication may take place via various types of wired or wireless connections or via non-volatile media.

Figure 5:
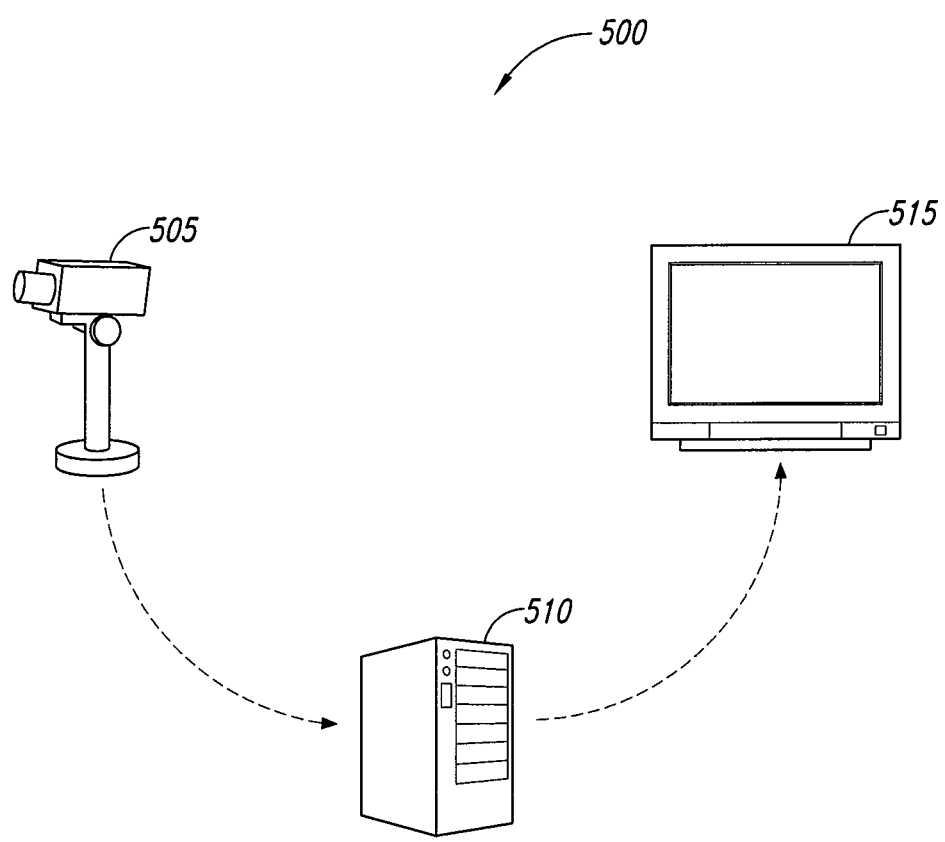
FIG. 5 is an embodiment of a distributed media delivery system with exemplary hardware.

FIG. 5 depicts an embodiment of a distributed media delivery system 500 with exemplary hardware. The system 500 includes a computing device 510 connected to a camera 505 and to a display 515. The computing device 510 serves as an embodiment of the media delivery system manager 100 and further contains an integrated environmental data server 170 as shown in FIG. 1B. The computing device 510 is programmed to carry out the functions of the media delivery system manager 100 as are described in detail above.

Figure 6:
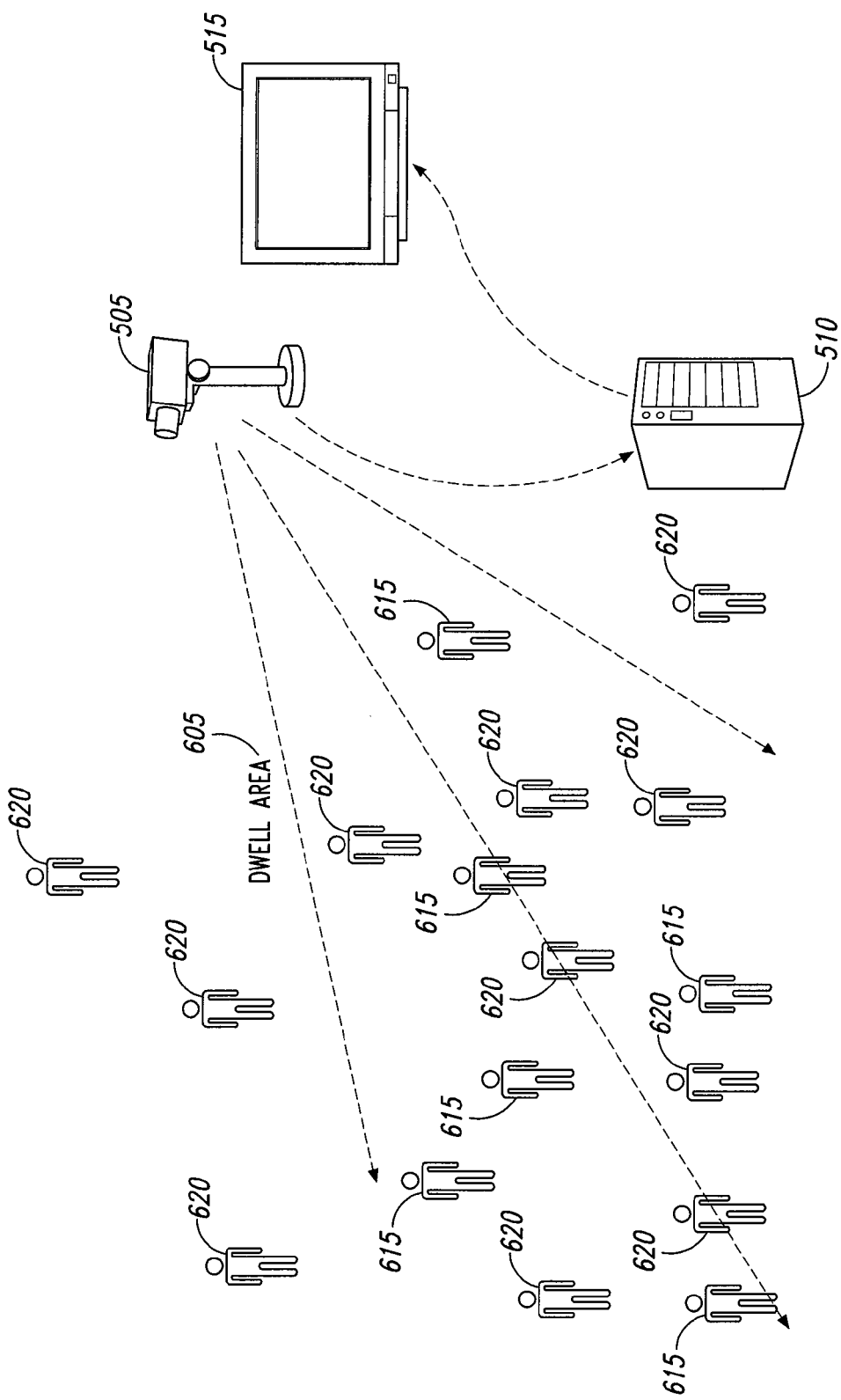
FIG. 6 is diagram of an embodiment of a distributed media delivery system operating in a sample setting.

The display 515 is coupled to the computing device 510 for rendering external media content 185 as shown in FIG. 1B. The external media content 185 is, in embodiments of the invention, advertising media content. The computing device 510 is also connected to the camera 505 which serves as an environmental sensor 171 as depicted in FIG. 1B. As described above, while advertising media content is being rendered by the computing device 510 on the display 515, the computing device 510 uses images captured by the camera 505 to determine the number of impressions and other types of environmental data 175 as described more fully above. FIG. 6 depicts an embodiment of the distributed media delivery system 500 operating in an environment within a dwell area 605. The "dwell area" is a pre-defined area in the vicinity of the distributed media delivery system 500. The "dwell area" is typically the area in the vicinity of the system that can effectively be display monitored by the environmental sensors. In this example, the dwell area 605 is the area that can effectively be covered by the camera 505. The area that can be effectively covered by the camera 505 is dependent on a number of variables such as, for example, the camera field of view, the capture resolution of the camera, and the light sensitivity of the camera.

With further reference to FIG. 6, the images captured by the camera 505 are processed by the computing device 510 to provide, for example, data about the number of people in the dwell area at any given moment, the number of people viewing the advertising media content being rendered at that moment, and the number of people who are not viewing the advertising media. In the example of FIG. 6, the computing device 510 processes the images from the camera 505 to determine that there are 13 people in the dwell area 605, 6 people 615 viewing the advertising media content and 7 people 620 who are not view the advertising media content. The computing device 510 may be configured to process the images from the camera 505 using any of a variety of algorithms or procedures as described above. The computing device 510 may, for example, use face recognition technology to identify the number of persons in the dwell area 605 and may further use eye tracking algorithms to determine which of these persons is actually viewing the advertising media content. Of course, the use of the camera 505 as an environmental sensor is only exemplary and other sensors, as previously described, may provide adequate and useful back-channel information.

Figure 7:
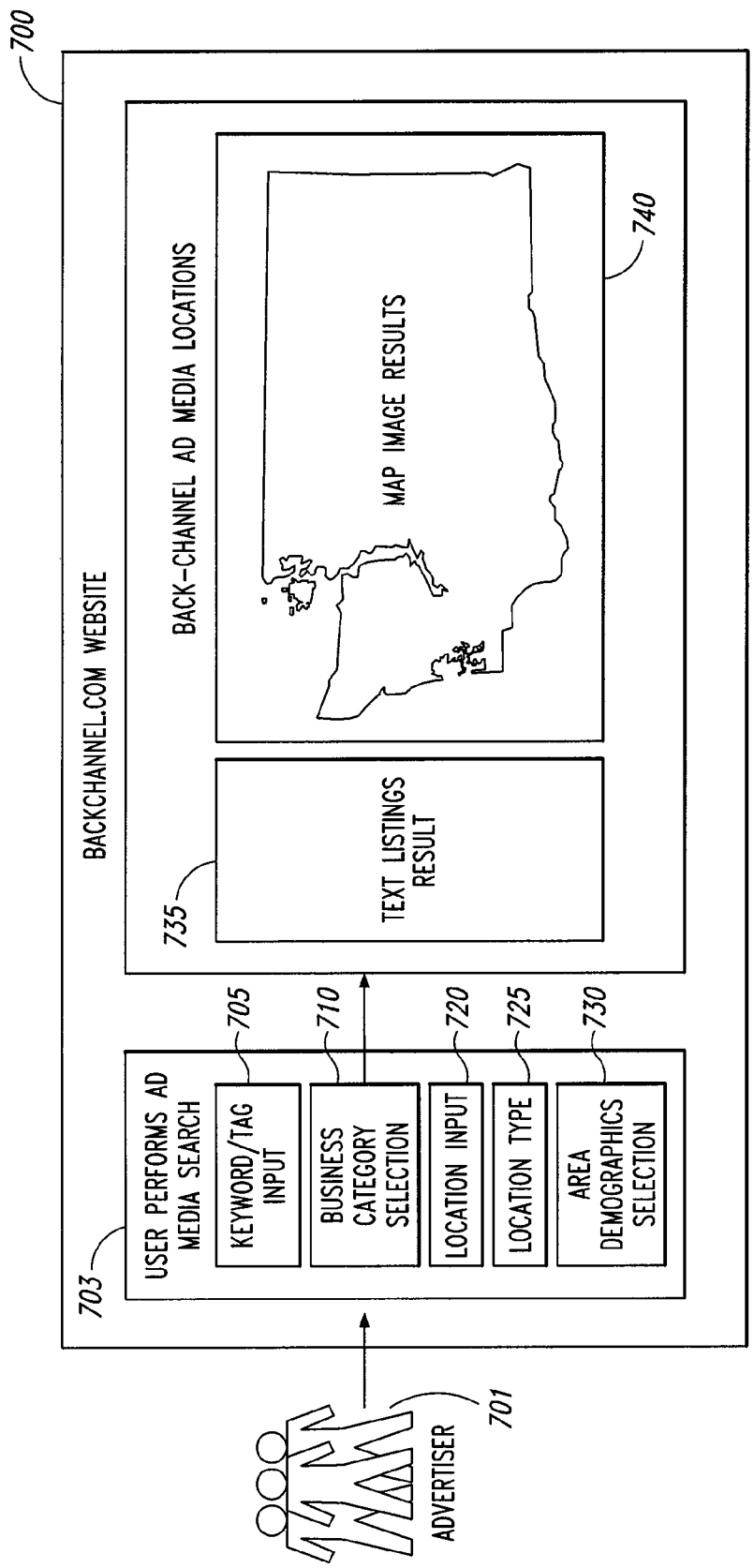
FIG. 7 is a schematic diagram of an embodiment of an online portal for viewing information related to distributed media delivery system locations.

FIG. 7 is a block diagram of a search portion of an online portal 700 according to an embodiment of the invention for viewing information related to publishing advertising on distributed media delivery systems. An advertiser 701 may, for example, use an ordinary web browser on a computer to navigate to the online portal 700 to publish advertising. The online portal 700 may include an advertising location search window 703, a textual results listing 735 and a map results window 740.

The online portal 700 may be configured to permit the advertiser 701 to search for the locations of distributed media delivery systems using the advertising location search window 703. The advertising location search window 703 may be configured to allow the advertiser 701 to search for advertising locations by business category 710, system location 720, location type 725 or area demographics 730. The business category 710 search may allow the advertiser 701 to search for locations based on a specific type of business. For example, the advertiser 701 could search for and find all advertising locations located at, such as, shoe stores or gas stations. The system location 720 search may allow the advertiser 701 to search for and locate all advertising locations in a certain geographic region such as city, county, state or country. The location type 725 search may allow the advertiser 701 to search for advertising locations of a particular type such as airports, shopping malls, ferries and the like. The area demographics 730 search may allow the advertiser 701 to find advertising locations based on the demographics of persons likely to view advertising on distributed media delivery systems and such locations. For example, the advertiser 701 could search for all locations that see predominately teenage viewers, sports fan viewers, or viewers of a particular age or income. Of course, such a search is limited only by the availability of demographic data and not to any particular type of demographic data.

After the advertiser 701 enters their search in the advertising location search window 703, a textual listing of the search results may be displayed in the textual results listing 735. The textual listing may contain any variety of data, such as the address, business hours, business type, and the like, that would be pertinent to choosing an advertising location. Likewise, all the advertising locations that are found during the search may be displayed in the map results window 740. The map results window 740 may be configured to display any type of map. For example, the map results window 740 may be configured to display a map of some geographic region such as the state of Washington as shown in FIG. 7. Alternatively, the map results window 740 may display a map of some other area such as, for example, the layout of a shopping mall. Once the map is displayed in the map results window 740, markers indicating advertising locations (not shown) are overlaid on the map to graphically illustrate all the locations available.

Figure 8:
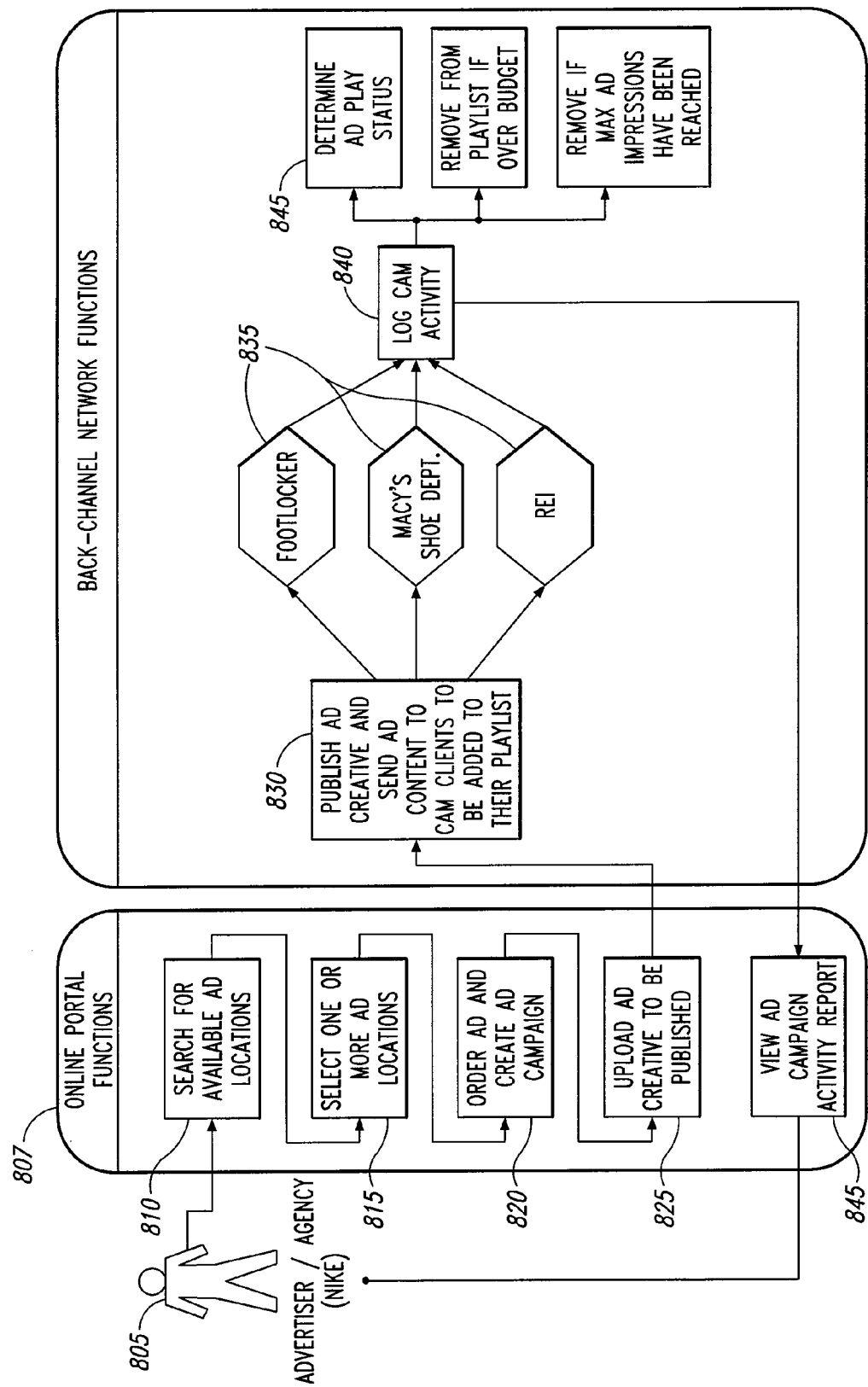
FIG. 8 is a process flow diagram of a method for publishing advertising according to an embodiment of the invention.

The utility of the search functions shown in FIG. 7 of the online portal 700 is best understood in the context of the process flow for publishing advertising as shown in FIG. 8. FIG. 8 is a process flow diagram according to one embodiment of a method for purchasing and displaying advertisements on particular distributed media delivery systems. The process flow begins when an advertiser 805 navigates to, for example, the online portal 700 of FIG. 7. In addition to the search capabilities discussed above in relation to FIG. 7, the online portal 700 is also configured to permit or perform additional functions. In one embodiment, the online portal 700 is configured to permit the functions shown in steps 815, 820, 825 and 845.

After completing a suitable search at step 810, the advertiser 805 selects one or more advertising locations at step 815. The online portal 700 allows the advertiser 805 to publish advertising at the selected advertising locations at step 820. After completing the purchase, the online portal 700 allows the advertiser 805 to upload their advertising media content, if available, to the online portal 700 at step 825. The advertising media content may be any of a variety of different media types as previously discussed.

After the advertising media content is uploaded to the online portal 700, the advertising media content is then published to a back-end network and further forwarded to the distributed media delivery systems at each of the selected advertising locations 835 at step 830. The advertising media content is then rendered on the distributed media delivery system at each location 835 while the distributed data gathered by the environmental sensors is logged and/or processed at step 840. The raw or processed environmental data is then transferred back to the online portal and reports generated from such data may be viewed by the advertiser 805 at step 845. Based on this report, the advertiser may choose to alter their advertising strategy by changing the advertising media content, the advertising locations, and the like, in order to increase the number of impressions being made. These changes may be made by, for example, to playlist rules as discussed in greater detail above.

Figure 9:
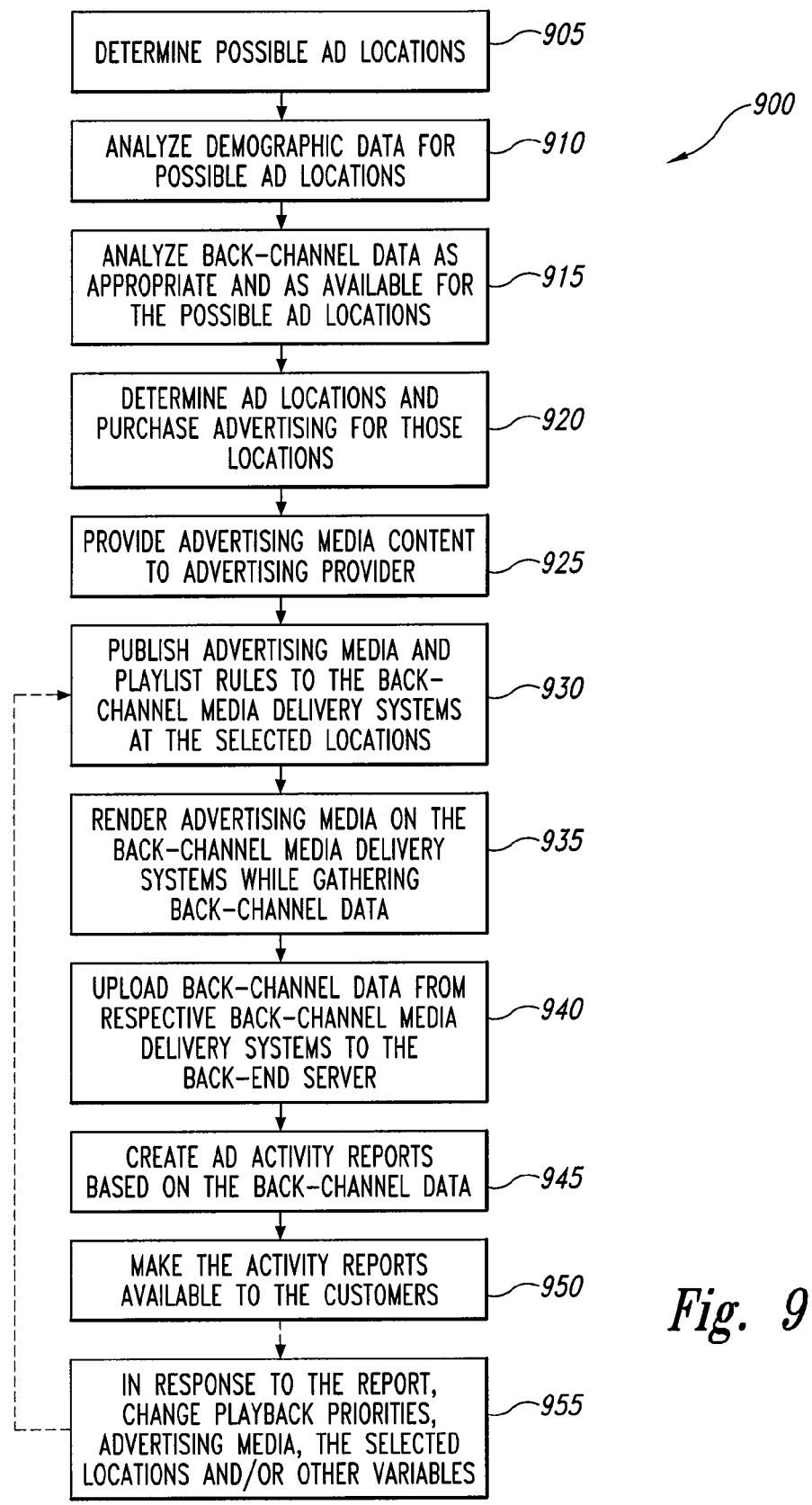
FIG. 9 is a detailed process flow diagram of an embodiment of the invention for publishing advertising using back-channel data.

FIG. 9 is a process flow diagram of an embodiment of the invention for publishing advertising using back-channel data. The process flow begins at step 905 where an advertiser determines possible locations to purchase advertising. The advertiser may make such a determination by any number of means. As was discussed above with reference to FIGS. 7 and 8, the advertiser uses the online portal to search among available advertising locations. However, other means of locating advertising locations are possible. For example, the advertiser might read through printed catalogs or other printed literature listing advertising locations and choose from among those listed. In a further example, the advertiser may cross-reference advertising locations with demographic information provided by third parties, such as demographic information based on ZIP codes. After finding possible advertising locations, the process flow continues to step 910 where the advertiser analyzes any demographic data that is available for the possible advertising locations. As was discussed above, there are many types of demographic information that might be associated with a given advertising location. For example, as previously discussed, probabilistic demographic information can be generated from a person's size, shape, height or the speed with which they move, as determined from information obtained by the environmental sensor.

The process flow continues on to step 915 where the advertiser analyzes any back-channel data that is available for the possible advertising locations. The analysis of the demographic and back-channel data at steps 910 and 915, respectively, permits the advertiser to determine the advertising locations they wish to target from among the possible advertising locations at step 920. Once these final advertising locations have been chosen, the advertiser purchases advertising time from the advertising service provider that controls the network of distributed media delivery systems, also at step 920. Various pricing structures may be used for purchasing advertising time, for example, advertising time may be offered at a standard rate, or in a further example, advertising time maybe offered through an auction mechanism with advertisers bidding for advertising time. After purchasing advertising time at step 920, the advertiser provides advertising media content to the advertising service provider at step 925. At step 930, the advertising service provider then publishes the advertising media content on the appropriate distributed media delivery systems at the locations previously determined by the advertiser.

Once the advertising media content is on the appropriate systems, at steps 935, 940 and 945, the systems render the media while gathering back-channel data, upload the data to the advertising service provider back-end system, and create reports based on that data, respectively, as previously described. The reports are then typically made available to the advertiser at step 950. The advertiser may optionally elect to change playback priorities, the advertising media content, the advertising locations and/or other variables at step 955. These changes are propagated back in the process flow to step 930. In this way, back-channel data gathered during delivery of advertising media content is used as feedback to iteratively optimize the advertising scheme. Although the steps of the process flow of FIG. 9 appear similar to that described with respect to FIG. 8, FIG. 9 illustrates a more general process flow. Many of the steps of the process flow of FIG. 9 need not, for example, be accomplished using the online portal 700 or other automated means.

From the foregoing it will be appreciated that, although specific embodiments of the invention have been described herein for purposes of illustration, it will be understood by one skilled in the art that various modifications may be made without deviating from the invention. Accordingly, the invention is not limited except as by the appended claims.

What is claimed is:

1. A system for publishing advertising media, comprising:
   a plurality of media delivery systems each configured to render media according to playback rules and gather environmental data while rendering the media, wherein the environmental data is gathered by one or more RFID sensors configured to detect RFID tags; and
   a back-end system in communication with the plurality of media delivery systems, the back-end system configured to provide the media and the playback rules to the selected media delivery systems and to receive the environmental data from the plurality of media delivery systems, wherein the back-end system is further configured to receive the media from an advertiser and permit the advertiser to select at least one of the plurality of media delivery systems on which to render the media;
   wherein the environmental data comprises a quantity and type of products people in a dwell area around a media delivery system in their proximity based on the one or more RFID sensors detecting RFID tags associated with the products, wherein the playback rules specify rendering the media based, at least in part, on the environmental data gathered by one of the plurality of media delivery systems while rendering the media, and wherein the playback rules specify rendering media that is related to or complementary of the type of product people in the dwell area around the media delivery system in their proximity.

2. The system of claim 1 wherein each of the plurality of media delivery systems is associated with an advertising location and the back-end system is further configured to permit an advertiser to search for possible advertising locations based on advertising location search criteria.

3. The system of claim 2 wherein the advertising location search criteria comprises at least one of: geographic location, type of location, sub-location within a location, demographic data, and advertising statistics.

4. The system of claim 1 wherein the back-end system is configured to provide information to the advertiser related to historical environmental data for the plurality of media delivery systems.

5. The system of claim 1 wherein each of the plurality of media delivery systems is further configured to render media based, at least in part, on the environmental data gathered while rendering the media.

6. The system of claim 1 wherein the back-end system is configured to permit the advertiser to modify the playback rules to alter rendering of the media.

7. The system of claim 1 wherein the playback rules further comprise instructions for rendering the media depending on at least one of: a time of day, a day of the week, the media previously rendered, playback quotas, and perishability.

8. The system of claim 1 wherein the back-end system is configured to generate reports based, at least in part, on the environmental data.

9. The system of claim 1 wherein the back-end system is further configured to interface with an online portal.

10. The system of claim 9 wherein the back-end system comprises a computer including a web server.

11. The system of claim 10 wherein the back-end system is further configured to receive the media from the online portal.

12. The system of claim 11 wherein the online portal is configured to permit the advertiser to perform at least one of: a search for possible respective locations of each of the plurality of media delivery systems, a selection of at least one advertising location, and a purchase of advertising for the at least one advertising location.

13. A method of publishing advertising, the method comprising:
  providing advertising media to a back-end server;
  generating playback rules associated with the advertising media with the back-end server, wherein the playback rules are based on a type of product identified by an associated RFID tag, and wherein the playback rules determine media for products related to the product identified by the associated RFID tag;
  providing the advertising media and the playback rules to at least one of a plurality of media delivery systems;
  rendering the advertising media on the at least one of a plurality of media delivery systems according to the provided playback rules;
  determining a number of people in a dwell area around one or more of the plurality of media delivery systems;
  identifying types of products in a dwell area around at least one of the plurality of media delivery systems with an RFID sensor detecting RFID tags;
  receiving environmental data from the media delivery system during the rendering of the advertising media, wherein the environmental data includes quantity an type of products in the dwell area as identified by their respective RFID tags; and
  generating at least one environmental data activity report with the back-end server based, at least in part, on the environmental data;
  wherein the playback rules specify rendering the media based, at least in part, on the environmental data and wherein the environmental data further comprises a number of people in a dwell area, and a number of people in the dwell area viewing the media.

14. The method of claim 13 further comprising: determining a plurality of advertising locations by searching for advertising locations based on advertising location search criteria.

15. The method of claim 14 wherein advertising location search criteria comprises at least one of: geographic location, type of location, sub-location within a location, demographic data, and advertising statistics.

16. The method of claim 13 wherein playback rules further comprise instructions for rendering the advertising media depending on at least one of: a time of day, a day of the week, the advertising media previously rendered, playback quotas, and perishability.

17. The method of claim 13 wherein providing the advertising media and playback rules to the at least one of a plurality of media delivery systems comprises transmitting the advertising media and playback rules from the back-end server to the at least one of a plurality of media delivery systems.

18. The method of claim 13, wherein the at least one environmental data activity report is based, at least in part, on historical environmental data for the media delivery system.

19. The method of claim 13, wherein said rendering comprises:
  rendering the advertising media while gathering the environmental data, wherein the rendering is based, at least in part, on the playback rules and the gathered environmental data.

20. The method of claim 19, further comprising: after said generating the at least one environmental data activity report, altering playback rules associated with the provided advertising media.

21. The method of claim 13, further comprising:
  generating new advertising instructions based, at least in part, on the generated environmental data activity report.

22. The method of claim 13 wherein said providing advertising media to a back-end server comprises accessing an online portal.

* * * * *